(12) United States Patent
Kyotani (10) Patent No.: US 6,409,802 B1
(45) Date of Patent: Jun. 25, 2002

(54) METHOD FOR PREVENTING SCALING IN WET-PROCESS WASTE GAS TREATMENT EQUIPMENT

(75) Inventor: Takashi Kyotani, Yokohama (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/463,662

(22) PCT Filed: Nov. 6, 1998

(86) PCT No.: PCT/JP98/04997

§ 371 (c)(1),
(2), (4) Date: Mar. 1, 2001

(87) PCT Pub. No.: WO99/24151

PCT Pub. Date: May 20, 1999

(30) Foreign Application Priority Data

Nov. 10, 1997 (JP) .............................................. 9-321975

(51) Int. Cl.[7] .............................................. B01D 53/14
(52) U.S. Cl. .............................. 95/152; 95/153; 95/154; 96/235
(58) Field of Search .............................. 96/235; 95/188, 95/190, 195, 206, 152, 153, 154, 155

(56) References Cited

U.S. PATENT DOCUMENTS

| 4,039,307 A | * | 8/1977 | Bondor |
| 5,643,797 A | * | 7/1997 | Schmidt |
| 5,649,985 A |   | 7/1997 | Imamura |
| 5,720,926 A | * | 2/1998 | Whipp et al. |
| 5,738,834 A | * | 4/1998 | Deberry |
| 5,770,164 A | * | 6/1998 | Moser et al. |

FOREIGN PATENT DOCUMENTS

| DE | 38 39 153 |   | 5/1990 |
| JP | 50-122470 |   | 9/1975 |
| JP | 50-137385 | * | 10/1975 |
| JP | 56-14151 |   | 10/1977 |
| JP | 53-43679 | * | 4/1978 |
| JP | 53-142981 | * | 12/1978 |
| JP | 57-45310 |   | 9/1982 |
| JP | 2-207813 | * | 8/1990 |
| JP | 5-184858 | * | 7/1993 |
| JP | 8-92888 |   | 4/1996 |
| WO | WO 97/37056 |   | 10/1997 |

OTHER PUBLICATIONS

Jacqueline I. Kroschwitz, Mary Howe–Grant, "Kirk–Othmer, Encyclopedia of Chemical Technology," 4th Edition, vol. 21, 720–816, John Wiley & Sons, Inc., 1997.

M.S. Tyagi, "Introduction to Semicondutor Materials and Devices," John Wiley & Sons, Inc., 1991, 299–562.

* cited by examiner

Primary Examiner—Duane S. Smith
(74) Attorney, Agent, or Firm—Oblon, Spivak, McClelland, Maier & Neustadt, P.C.

(57) ABSTRACT

A method for preventing scale formation in a wet type exhaust gas treating apparatus is disclosed. An exhaust gas is contacted with a washing liquid containing water. The washing liquid contains at least one chelating agent which reacts with ions becoming a cause of scale formation to form a water-soluble chelate compound.

38 Claims, 7 Drawing Sheets

METHOD FOR PREVENTING SCALING IN WET-PROCESS WASTE GAS TREATMENT EQUIPMENT

BACKGROUND OF THE INVENTION

1. Field of the Invention

This invention relates to a method for purifying an exhaust gas in a wet mode, and more particularly, to a method for preventing scale formation in a wet type exhaust gas treating apparatus.

2. Discussion of the Background

A wet type exhaust gas treating apparatus is an apparatus for contacting an exhaust gas with a washing liquid containing water to remove fine particles, a water-soluble substance, and a water-decomposable substance in the exhaust gas. The wet type exhaust gas treating apparatus uses, for example, a packed column, a spray tower, a gas passage tank, and an agitating gas passage tank.

As the washing liquid, tap water, or an aqueous solution containing some chemical in tap water is generally used. Such a wet type exhaust gas treating apparatus is often continuously run, and often circulates the washing liquid to decrease the amount of a waste liquor discharged to the environment.

With the wet type exhaust gas treating apparatus involving the circulation of a washing liquid, it is known to supply a constant amount of water to the washing liquid and simultaneously discharge the same amount of water in order to permit a continuous run while preventing the reaction product between the washing liquid and a harmful component in the exhaust gas from building up in the system.

However, there may be a buildup of insolubles, i.e., scale, in the washing liquid. If the insolubles form, they may adhere to a gas-liquid contact area, a circulating pump for the washing liquid, a piping, etc., causing a trouble such as blockage.

Particularly, it will present a problem if feed water to be supplied to the washing liquid contains ions which react with a harmful component in the exhaust gas to form an insoluble compound. For example, if the washing liquid is kept neutral or alkaline and the feed water contains iron ions, insoluble iron hydroxide may be formed. If the feed water supplied to the washing liquid contains calcium ions and the exhaust gas contains a fluorine gas ($F_2$) or carbon dioxide ($CO_2$), on the other hand, insoluble calcium fluoride and/or calcium carbonate may be formed in the washing liquid. Borate ions or silicate ions may also become the cause of scale.

An exhaust gas containing a fluorine gas ($F_2$) and carbon dioxide ($CO_2$) may be discharged from an apparatus for production of a semiconductor device. For example, when dry etching of a silicon wafer or the like is performed with the use of a semiconductor device manufacturing apparatus such as an etching apparatus, fluorinated hydrocarbons, such as $CF_4$, $CHF_3$ and $C_2F_6$, are used. An exhaust gas from the etching apparatus contains a fluorine gas ($F_2$) and carbon dioxide ($CO_2$), decomposition products of the fluorinated hydrocarbons.

During cleaning of the apparatus for producing a semiconductor device, an exhaust gas containing a fluorine gas ($F_2$) may be discharged. When a thin film is to be formed on a semiconductor substrate, a chemical vapor deposition apparatus is used as a semiconductor device manufacturing apparatus. In cleaning a thin film, adhered to the inner surface of a chamber or a piping of the chemical vapor deposition apparatus, with a $ClF_3$ gas, an exhaust gas containing a fluorine-containing gas, such as $F_2$, $SiF_4$, $BF_3$ or $PF_3$, is discharged from the chemical vapor deposition apparatus.

Furthermore, an exhaust gas from a semiconductor manufacturing apparatus may contain a boron compound such as $BCl_3$ or $BF_3$, or a silicon compound such as tetraethoxysilane (hereinafter referred to as TEOS) or $SiH_2Cl_2$. The boron compound and silicon compound react with water in the washing liquid, and decompose into borate ions and silicate ions. These borate ions and silicate ions cause scale formation.

The system involving the formation of such insoluble products has required periodical washing and replacement of some parts for the purpose of preventing troubles. Maintenance of a treating apparatus is tiresome, and the parts to be replaced are costly. It is occasionally performed to withdraw part of the washing liquid, thereby keeping the concentration of the insoluble compound in the washing liquid at a level not higher than its solubility. However, this procedure increases the amount of drainage, and is not preferred.

Japanese Unexamined Patent Publication No. 122470/1975 describes the prevention of scale deposition on the internal surface of a boiler by adding a chelant-surfactant to an aqueous system. Japanese Unexamined Patent Publication No. 92888/1996 describes the prevention of scale by adding citric acid or its salt in a deinking process for waste paper.

Neither publication, however, describes a method for treating an exhaust gas. Nor do these publications describe a method for treating an exhaust gas discharged from an apparatus for producing a semiconductor device.

SUMMARY OF THE INVENTION

A first aspect of the present invention aims to resolve the foregoing problems, and prevent the formation of an insoluble compound in a washing liquid. A second aspect and a third aspect of the invention are designed to produce a semiconductor device while treating an exhaust gas without forming an insoluble compound in a washing liquid.

In all aspects of the invention, a chelating agent in a washing liquid is coordinated with ions to form a water-soluble chelate compound, thereby preventing the formation of an insoluble product.

According to the first aspect of the invention, there is provided a method for purifying an exhaust gas in a wet mode, comprising the step of contacting the exhaust gas with a washing liquid containing water, the step of circulating the washing liquid to reuse it, the step of supplying a constant amount of a feed liquid per unit time to the washing liquid, and the step of discharging the constant amount of the washing liquid per the unit time from the washing liquid, the washing liquid containing at least one chelating agent which reacts with ions becoming a cause of scale formation to form a water-soluble chelate compound.

According to the second aspect of the invention, there is provided a method for producing a semiconductor device, comprising the step of etching a precursor of the semiconductor device with an etching gas or its plasma in a chamber, the step of discharging the etching gas or its plasma from the chamber, the step of contacting an exhaust gas discharged from the chamber with a washing liquid containing water, the step of circulating the washing liquid to reuse it, the step of supplying a constant amount of a feed liquid per unit time to the washing liquid, and the step of discharging the constant amount of the washing liquid per the unit time from the washing liquid, the washing liquid containing at least one chelating agent which reacts with ions becoming a cause of scale formation to form a water-soluble chelate compound.

According to the third aspect of the invention, there is provided a method for producing a semiconductor device, comprising the step of chemical vapor depositing a thin film-forming gas on a precursor of the semiconductor device in a chamber of a chemical vapor deposition apparatus to form a thin film, the step of withdrawing the resulting semiconductor device from the chamber, the step of cleaning the chamber of the chemical vapor deposition apparatus with a cleaning gas, the step of contacting an exhaust gas in the cleaning step, which has been discharged from the chamber of the chemical vapor deposition apparatus, with a washing liquid containing water, the step of circulating the washing liquid to reuse it, the step of supplying a constant amount of a feed liquid per unit time to the washing liquid, and the step of discharging the constant amount of the washing liquid per the unit time from the washing liquid, the washing liquid containing at least one chelating agent which reacts with ions becoming a cause of scale formation to form a water-soluble chelate compound.

According to a fourth aspect of the invention, there is provided a method for preventing scale formation in a wet type exhaust gas treating apparatus which treats an exhaust gas containing a fluorine gas and carbon dioxide by contacting the exhaust gas with a washing liquid, characterized in that at least one chelating agent which reacts with ions becoming a cause of scale formation to form a water-soluble chelate compound is added to the washing liquid.

Preferably, the invention further has the step of adding an aqueous solution containing the chelating agent to the washing liquid or the feed liquid. Alternatively, it is preferred for the invention to further have the step of adding a chemical solution containing water and the chelating agent to the washing liquid or the feed liquid. Alternatively, it is preferred that the feed liquid be obtained by the step of passing water through a column packed with a solid chelating agent having suitable solubility.

It is also preferred that the exhaust gas has been generated from a semiconductor device manufacturing apparatus.

Preferably, the exhaust gas contains an acidic gas, and the claimed method further has the step of adding a basic chemical solution to the washing liquid or the feed liquid. Alternatively, it is preferred that the exhaust gas contains a basic gas, and the claimed method further has the step of adding an acidic chemical solution to the washing liquid or the feed liquid.

Further preferably, a packed column, a spray tower, a gas passage tank, or an agitating gas passage tank is used in the contacting step.

Preferably, the ions are metal ions. Alternatively, the ions are preferably iron ions, calcium ions, borate ions, or silicate ions.

Furthermore, the chelating agent is preferably an aminocarboxylic acid or its salt, an oxycarboxylic acid or its salt, a silicate, or a polyphosphate.

Moreover, it is preferred for the claimed method to have the step of adding a chemical solution containing a pH adjustor to the washing liquid or the feed liquid. It is further preferred for the method to have the step of measuring the pH of the washing liquid, and the step of controlling the amount of the chemical solution containing the pH adjustor based on the measured value of pH.

BRIEF DESCRIPTION OF THE DRAWINGS

FIG. 8 is a schematic view of an embodiment of an etching apparatus; and

FIG. 9 is a schematic view of another embodiment of the etching apparatus.

DESCRIPTION OF THE PREFERRED EMBODIMENTS

The present invention prevents scale formation by adding a suitable chelating agent in a wet type exhaust gas treating apparatus in which a constant amount of water is fed to a washing liquid, and simultaneously the same amount of water is discharged. For the addition of the chelating agent, the following three methods are available:

(1) An aqueous solution of a chelating agent is added to the washing liquid by a suitable method.

(2) A suitable chelating agent is mixed beforehand with a chemical solution to be added for imparting treating performance to the washing liquid.

(3) Feed water is passed through a column packed with a solid chelating agent having suitable solubility, and then added to the washing liquid.

These three methods will be described in detail with reference to the attached drawings.

Figure 1:
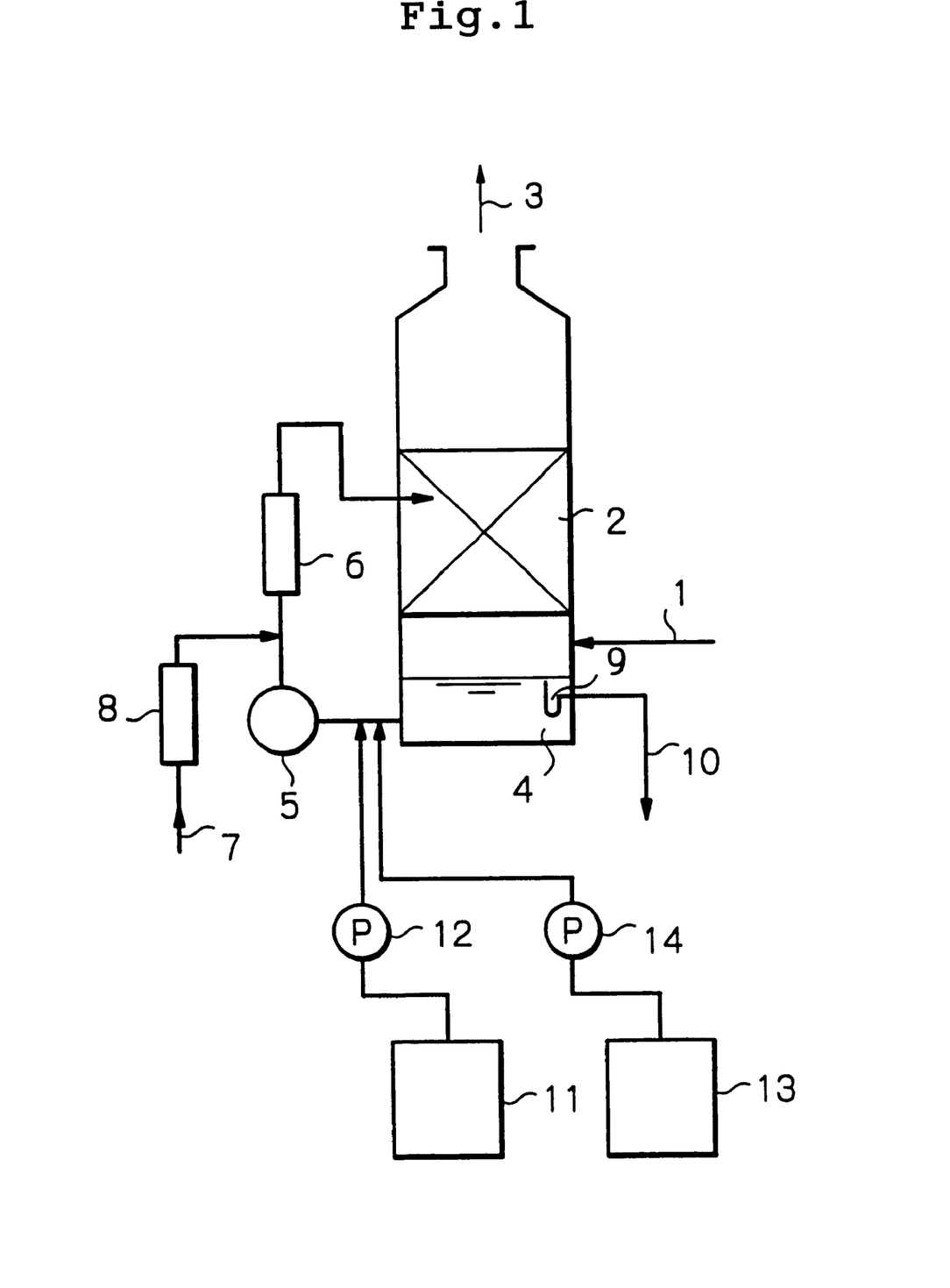
FIG. 1 is a schematic view of a device for performing the method of the present invention.
Figure 2:
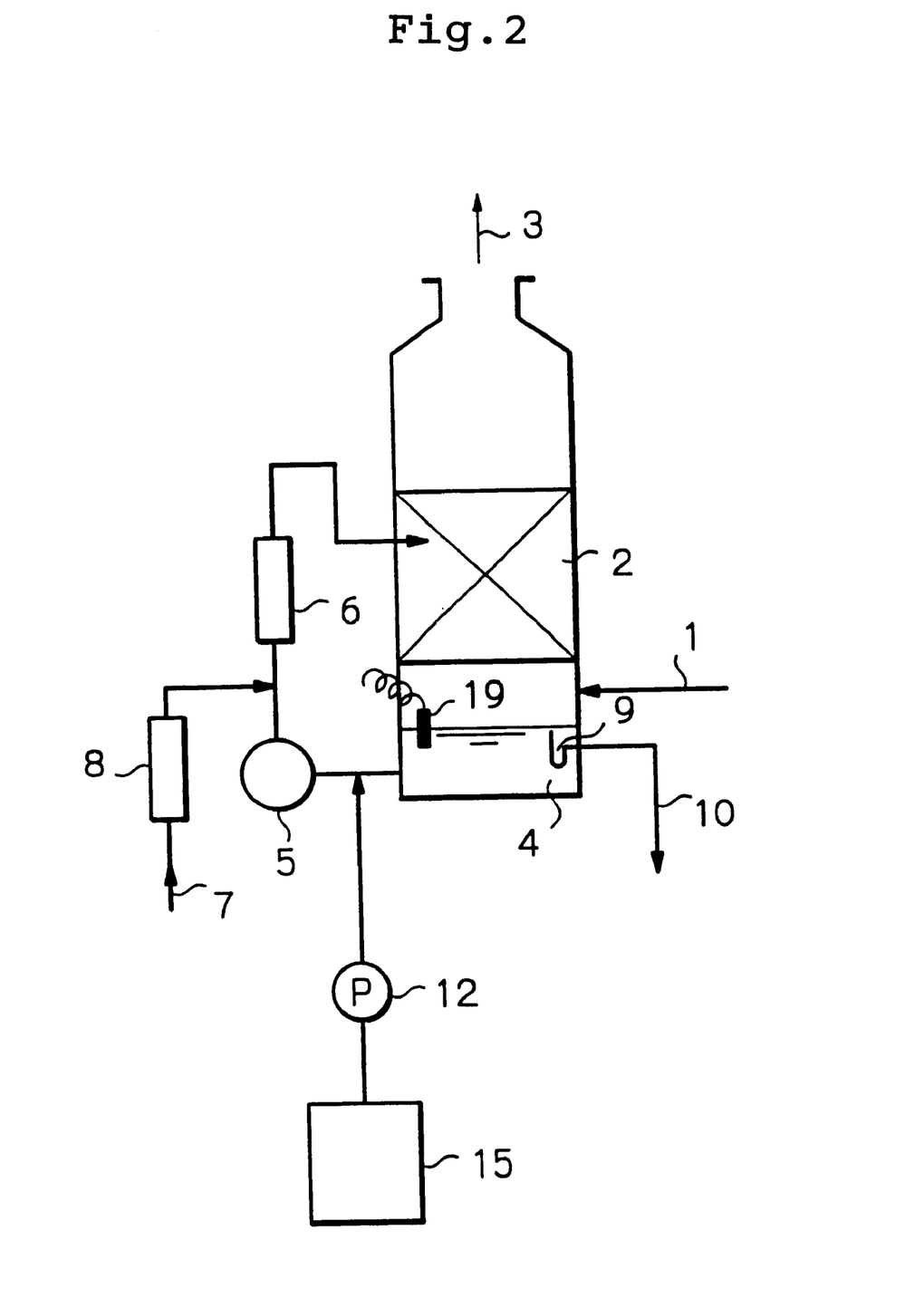
FIG. 2 is a schematic view of another device for performing the method of the present invention.
Figure 3:
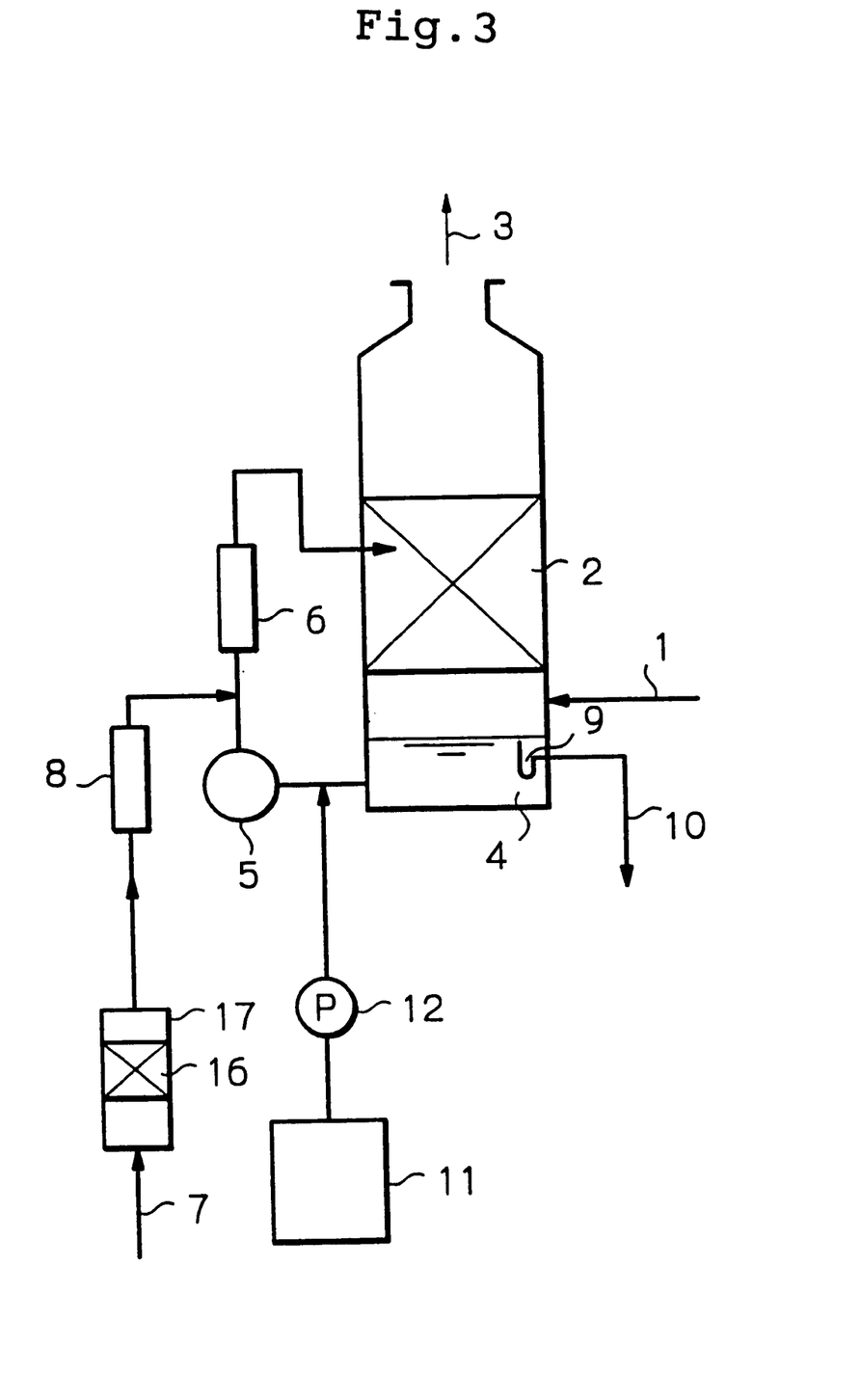
FIG. 3 is a schematic view of still another device for performing the method of the present invention.

FIGS. 1 to 3 are schematic views of apparatuses corresponding to the methods (1) to (3). In FIGS. 1 to 3, the reference numeral 1 denotes an exhaust gas, 2 a gas-liquid contact area, 3 a treated gas, 4 a washing liquid, 5 a circulating pump, 6 a flow meter, 7 feed water, 8 a flow meter, 9 a drainage pipe, 10 waste water, 11 a chemical solution, 12 and 14 pumps, 13 an aqueous solution of a chelating agent, 15 a mixed solution of a chemical solution and a chelating agent, 16 a solid chelating agent, 17 a dissolving tank, and 19 a pH electrode for measuring pH.

With reference to FIG. 1, the exhaust gas 1 is contacted with the washing liquid 4 in the gas-liquid contact area 2, thereby rid of components to be treated, and discharged as the treated gas 3. The washing liquid 4 is circulated in the apparatus by the circulating pump 5. To the washing liquid, a constant amount of feed water 7 is supplied via the flow meter 8. Waste water 10 in the same amount as the amount of feed water supplied is discharged by the drainage pipe 9. To obtain constant treating performance, the chemical solution 11 is supplied to the circulating water by the pump 12. Simultaneously, the aqueous solution 13 of a chelating agent adjusted to a suitable concentration is added to the circulating water by the pump 14.

Examples of the chelating agent are ① aminocarboxylic acids, such as EDTA (ethylenediaminetetraacetic acid), and their salts, ② oxycarboxylic acids, such as citric acid, and their salts, ③ silicates such as sodium metasilicate, and ④ polyphosphates such as sodium pyrophosphate. It goes without saying that other chelating agents may be used, if they can form in the washing liquid water-soluble complexes with ions in the feed water or washing liquid which will serve as the origin of insoluble products.

The concentration of the chelating agent in the washing liquid needs to be adjusted in consideration of the ion concentration in the feed water, the amount of the feed water, and the composition of the washing liquid so that the concentration of the chelating agent will be at least the concentration necessary for converting most of ions in question into chelate compounds. The concentration, and the amount of supply, of the aqueous solution of the chelating agent need to be determined to fulfill this requirement.

In FIG. 1, the chemical solution 11 and the aqueous solution 13 of chelating agent are added to circulating water. However, the chemical solution 11 and/or the aqueous solution 13 of chelating agent may be added to the feed water 7.

Next, with reference to FIG. 2, the exhaust gas 1 is contacted with the washing liquid 4 in the gas-liquid contact area 2, thereby rid of components to be treated, and discharged as the treated gas 3. The washing liquid 4 is circulated in the apparatus by the circulating pump 5. To the washing liquid, a constant amount of feed water 7 is supplied via the flow meter 8. Waste water 10 in the same amount as the amount of feed water supplied is discharged by the drainage pipe 9. To obtain constant treating performance, the mixed solution 15 of a chemical and a chelating agent is supplied by the pump 12.

The same chelating agent as described in connection with FIG. 1 can be used. However, it is necessary to select such a chelating agent as will not cause heat generation or other troubles with treatment upon mixing with the chemical for obtaining treating performance.

The concentration of the chelating agent in the washing liquid needs to be adjusted in consideration of the ion concentration in the feed water, the amount of the feed water, and the composition of the washing liquid so that the concentration of the chelating agent will be at least the necessary concentration to convert most of ions in question into chelate compounds. The chelating agent is fed simultaneously with the chemical to be added to impart treating performance. Thus, it is also necessary to determine the amount of the chelating agent added, in view of the amount of the chemical solution used as an additive for imparting treating performance.

In FIG. 2, the mixed solution 15 is added to circulating water. However, the mixed solution 15 may be added to the feed water 7.

With reference to FIG. 3, the exhaust gas 1 is contacted with the washing liquid 4 in the gas-liquid contact area 2, thereby rid of components to be treated, and discharged as the treated gas 3. The washing liquid 4 is circulated in the apparatus by the circulating pump 5. To the washing liquid, a constant amount of feed water 7 is supplied via the dissolving tank 17 charged with a suitable solid chelating agent 16, and via the flow meter 8. Waste water 10 in the same amount as the amount of feed water supplied is discharged by the drainage pipe 9. To obtain constant treating performance, the chemical solution 11 is supplied by the pump 12.

The same chelating agent as described in connection with FIG. 1 can be used. However, it is necessary to select a solid chelating agent having solubility such that the concentration of the chelating agent in the washing liquid will be the necessary concentration to prevent formation of insoluble products.

In FIG. 3, the chemical solution 11 is added to circulating water. However, the chemical solution 11 may be added to the feed water 7.

The washing liquid may contain a pH adjustor, a buffer, and a surfactant in addition to the chelating agent. Examples of the pH adjustor are chemicals for imparting basicity, such as sodium hydroxide and potassium hydroxide, and chemicals for imparting acidity, such as hydrochloric acid and sulfuric acid.

If the exhaust gas contains an acidic gas, such as a gas of hydrochloric acid, the washing liquid gradually becomes acidic, and decreases in pH. To prevent the decrease in pH, it is necessary to add a basic chemical solution to the washing liquid or the feed water. Examples of the basic chemical solution are aqueous solutions of sodium hydroxide and potassium hydroxide.

If the exhaust gas contains a basic gas, such as ammonia, the washing liquid gradually becomes basic, and increases in pH. If free iron ions exist (for example, if the amount of the chelating agent reacting with iron ions is small), iron hydroxide forms, developing scale. To prevent the increase in pH, it is necessary to add an acidic chemical solution to the washing liquid or the feed liquid. Examples of the acidic chemical solution are diluted hydrochloric acid and diluted sulfuric acid.

The pH of the washing liquid 4 is preferably measured with a pH meter such as the pH electrode 19. Further preferably, the amount of the chemical solution supplied is controlled based on the readings on the pH meter. Control may be performed by human judgment, or may be automatic control using a computer.

A packed column, a spray tower, a gas passage tank, or an agitating gas passage tank is used in the gas-liquid contacting device. The gas-liquid contacting device may be, for example, a packed column as illustrated in FIG. 5(a).

Figure 5A:
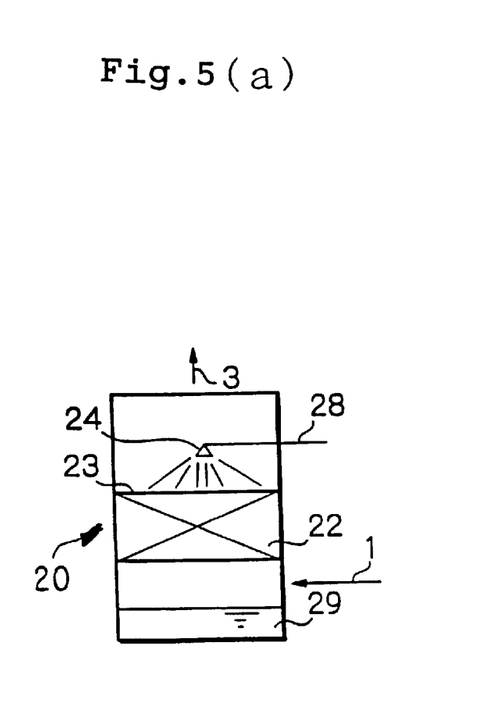
FIG. 5(a) is a schematic view of an embodiment of a gas-liquid contacting device.

FIG. 5(a) shows a packed column 20 packed with packing 22 such as Raschig rings. The exhaust gas is generally introduced into a region above the liquid level of a washing liquid 29 and below the packing 22, and is brought into contact with the packing 22. Then, the treated gas is discharged from above the packing 22. On the other hand, a washing liquid 28 is introduced onto an upper surface 23 of the packing 22 through a spray nozzle 24 or the like disposed above the packing 22. In a lower portion of the packed column 20, the washing liquid 29 is held. Mainly while the exhaust gas 1 and the washing liquid 28 are passing through the packing 22, the exhaust gas 1 and the washing liquid 28 contact each other. There are no restrictions on the shape and size of the packing 22, and any packing which permits gas-liquid contact can be used.

Figure 5B:
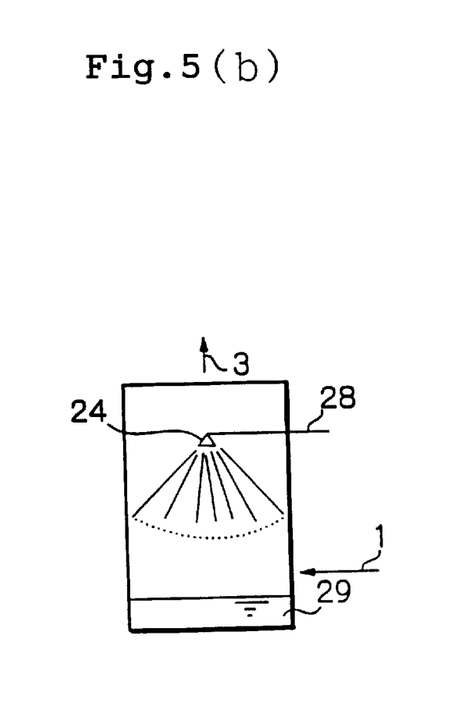
FIG. 5(b) is a schematic view of another embodiment of the gas-liquid contacting device.

FIG. 5(b) shows a spray tower having a spray nozzle 24 installed inside. Through the spray nozzle 24, a washing liquid 28 is jetted in a spray form. Mainly when the exhaust gas 1 passes through the spray, gas-liquid contact takes place.

Figure 6A:
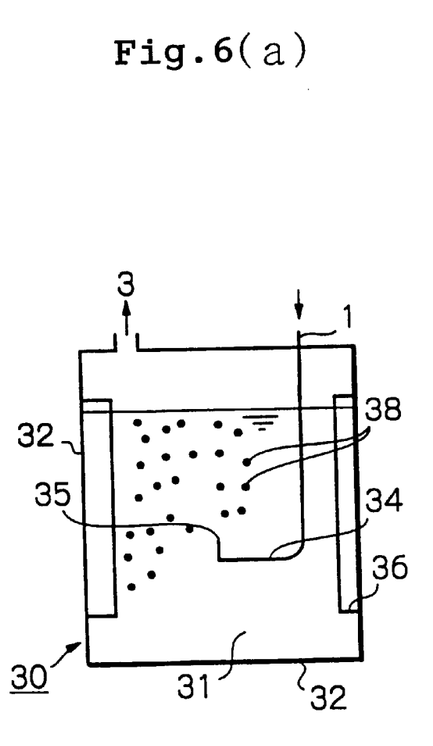
FIG. 6(a) is a schematic view of still another embodiment of the gas-liquid contacting device.

FIG. 6(a) shows a gas passage tank. A gas passage tank 30 has a tank 32 for holding a washing liquid 31, and an exhaust gas introducing portion 34 for introducing an exhaust gas into the washing liquid. Preferably, a baffle plate 36 is provided on a side wall of the tank 32.

An exhaust gas 1 is introduced into the exhaust gas introducing portion 34, and admitted into the washing liquid 31 from a front end 35 of the exhaust gas introducing portion 34. Bubbles 38 of the exhaust gas rise through the washing liquid 31, gather in an upper space of the tank 32, and discharge. The washing liquid 31 is introduced into the tank 32 via a piping (not shown), and discharged from the tank 32 through a piping (not shown).

Figure 6B:
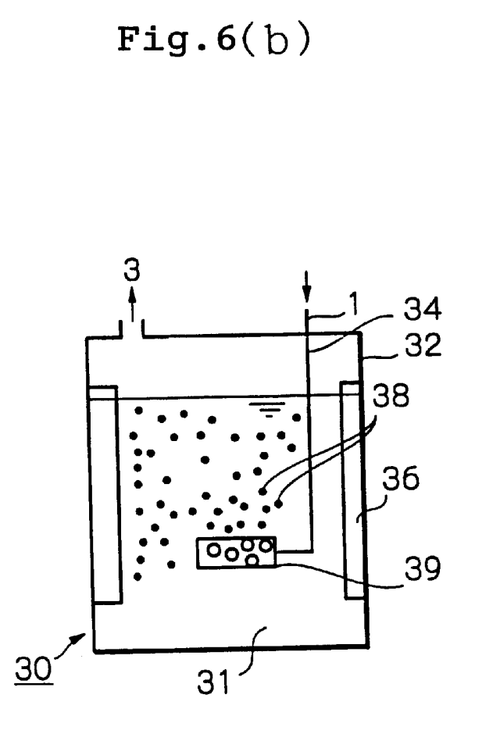
FIG. 6(b) is a schematic view of a further embodiment of the gas-liquid contacting device.

FIG. 6(b) shows a gas passage tank 30 using a multi-hole pipe 39. The multi-hole pipe 39 is attached to a front end of an exhaust gas introducing portion 34, whereby tiny bubbles 39 can be introduced into a washing liquid 31. In FIG. 6(b), elements common to FIG. 6(a) are assigned the same reference numerals, and their explanations are omitted.

An agitating gas passage tank can be used as a gas-liquid contact device. The agitating gas passage tank preferably has a tank for holding a washing liquid, an agitating portion for agitating the washing liquid, and an exhaust gas introducing portion for introducing an exhaust gas into the washing liquid. The agitating portion has, for example, a motor, a shaft rotatably joined to the motor, and a blade fixed to the shaft. The exhaust gas is introduced into the washing liquid from an outlet of the exhaust gas introducing portion. The outlet of the exhaust gas introducing portion is preferably near the blade of the agitating portion.

Figure 7A:
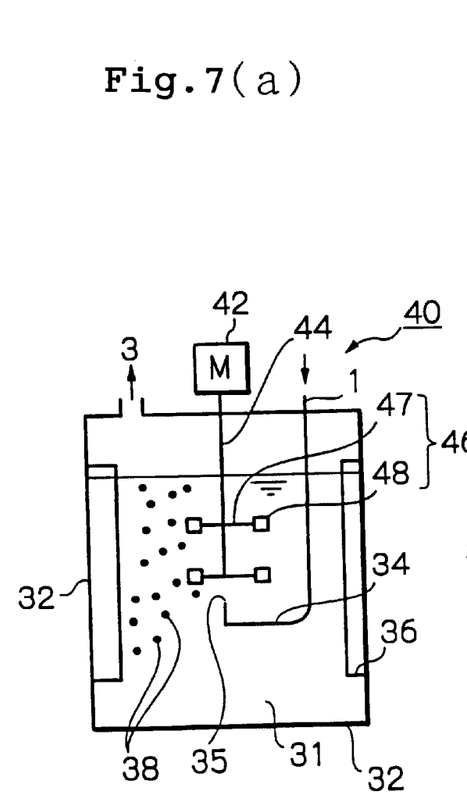
FIG. 7(a) is a schematic view of a still further embodiment of the gas-liquid contacting device.
Figure 7B:
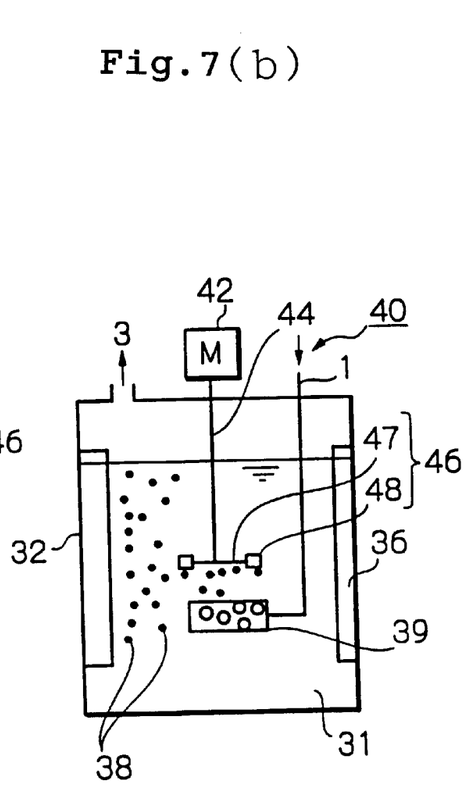
FIG. 7(b) is a schematic view of an additional embodiment of the gas-liquid contacting device.

In short, the agitating gas passage tank has the agitating portion provided in an agitation tank. In FIGS. 7(a) and 7(b), elements common to FIGS. 6(a) and 6(b) are assigned the same reference numerals, and their explanations are omitted.

In FIGS. 7(a) and 7(b), an agitating portion 40 has a motor 42, a shaft 44 rotatably joined to the motor, and an agitating blade 46 fixed to the shaft.

In FIG. 7(a), two or more of the agitating blades 46 (disc turbine blades) are fixed to the shaft 44, and each agitating blade 46 has a disc-shaped circumferential portion 47 and right-angled turbine blades 48. Immediately below the agitating blade 46 located at a lowermost position, a front end 35 of an exhaust gas introducing portion 34 is placed. The agitating blades are preferably installed at two levels, an upper level and a lower level, in order to increase the dwell time of bubbles in the liquid and the shearing force of the agitating blade.

The agitating blades 46 are rotated at a high speed in the washing liquid, and at the same time, an exhaust gas is guided into a washing liquid 31 from the front end 35 of the exhaust gas introducing portion 34. By the shearing force of the agitating blades 46, the exhaust gas is formed into tiny bubbles, and dispersed in the liquid.

In FIG. 7(b), an exhaust gas is guided, in a state made tiny by a multi-hole pipe 39, from immediately below an agitating blade 46. Further, the gas in tiny form is turned into tiny bubbles by the shearing force of the agitating blade 46 installed just above there, and dispersed in the liquid.

Apparatuses for production of a semiconductor device include, for example, an etching apparatus, and a chemical vapor deposition (CVD) apparatus. An exhaust gas occurring from the apparatus for production of a semiconductor device includes an exhaust gas generated during a manufacturing process for the semiconductor device, and an exhaust gas generated during cleaning of the manufacturing apparatus after production of the semiconductor device.

Examples of the semiconductor device are not restricted, and include diode, transistor, thyristor, memories such as ROM and RAM, and CPU.

Precursors of the semiconductor device are, for example, a substrate composed of a semiconductor, and a laminate of the substrate and a thin film placed thereon. The semiconductor of the substrate includes, for example, the elements of group IV, such as silicon; and compound semiconductors, such as III–V compound semiconductors and II–VI compound semiconductors.

When the precursor of the semiconductor device is etched with an etching gas or its plasma, an exhaust gas is discharged. The etching step in the method for producing a semiconductor device is described, for example, in Japanese Patent Publication Nos. 14151/1981 and 45310/1982. All the disclosures of Japanese Patent Publication Nos. 14151/1981 and 45310/1982 are cited in the present specification. Methods for producing semiconductors, and semiconductor devices are also described in Jacqueline I. Kroschwitz, Mary Howe-Grant, "Kirk-Othmer, Encyclopedia of Chemical Technology", 4th Edition, Vol. 21, 720–816, John Wiley & Sons, Inc., 1997. All the descriptions in this publication are cited in the present specification. Semiconductor devices are further described in M. S. Tyagi, "Introduction to Semiconductor Materials and Devices," John Wiley & Sons, Inc., 1991, 299–562. Its descriptions are cited in the present specification. Furthermore, methods for producing semiconductor devices are described on pages 563–612 of "Introduction to Semiconductor Materials and Devices". Its descriptions are cited in the present specification.

Etching includes sputter etching which is performed by physical bombardment of an etching gas, reactive ion etching which uses synergy between physical bombardment of an etching gas and a chemical reaction with the etching gas, and plasma etching which relies on a chemical reaction with an etching gas without substantially involving physical bombardment of the etching gas.

For sputter etching, a fluorinated hydrocarbon such as $CF_4$, $CHF_3$ or $C_2F_6$ is preferably used as an etching gas. In reactive ion etching and plasma etching, $BCl_3$, $BF_3$, and $Cl_2$ are used preferably as etching gases.

FIG. 8 is a schematic view of an etching apparatus. The etching apparatus has a vacuum chamber 50, and an electrode 52 placed inside the vacuum chamber 50. The electrode 52 is connected to a high frequency voltage 58. On the electrode 52, a precursor 62 of a semiconductor device, e.g., a semiconductor wafer, is placed. The high frequency voltage is applied to the electrode 52 with an etching gas 64 being flowed into the vacuum chamber 50, whereby sputter etching or reactive ion etching is performed for the precursor 62 of the semiconductor device. In this case, the type of the etching gas 64 determines which of sputter etching and reactive ion etching is performed. An exhaust gas 66 is discharged from the vacuum chamber, and introduced into an exhaust gas treating apparatus.

In FIG. 8, one electrode was used. However, as shown in FIG. 9, a pair of electrodes 54 and 56 may be used. In FIG. 9, a high frequency voltage 58 is applied to the electrode 54 and the electrode 56, with an etching gas 64 being flowed into a vacuum chamber 50, whereby sputter etching or reactive ion etching is performed for a precursor 62 of a semiconductor device placed on the electrode 54. An exhaust gas 66 is discharged from the vacuum chamber, and introduced into an exhaust gas treating apparatus.

EXAMPLES

The present invention will now be described concretely by way of Examples, which in no way limit the invention.

EXAMPLE 1

Figure 4:
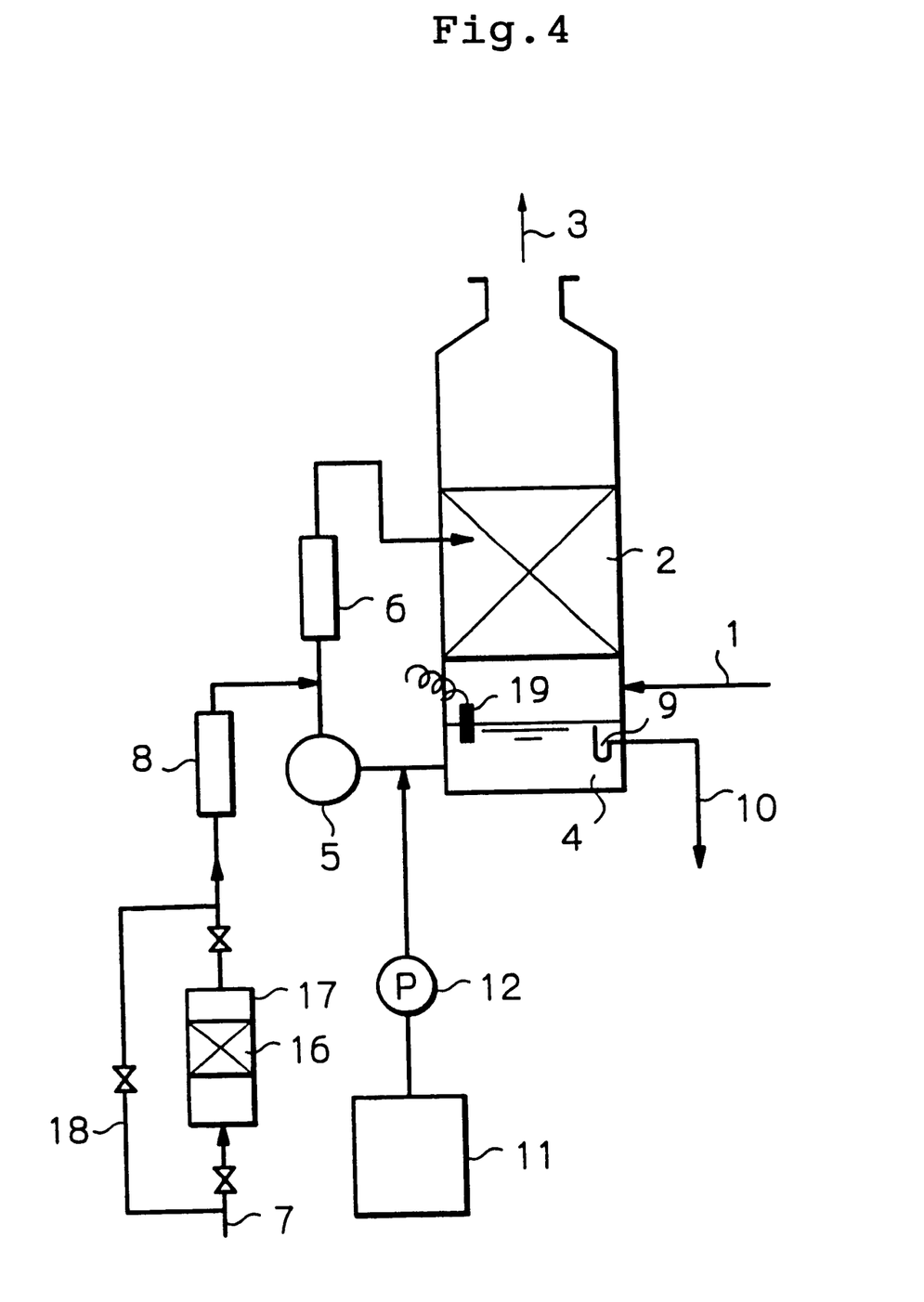
FIG. 4 is a schematic view of a further device for performing the method of the present invention.

FIG. 4 is a schematic view of an apparatus for carrying out the present invention. In FIG. 4, the apparatus of FIG. 3 is equipped with a bypass pipe 18 (an instrument for comparison) having a valve bypassing a dissolving tank 17, and a pH electrode 19 for monitoring the pH of a washing liquid.

In the schematic view as FIG. 4, an exhaust gas 1 containing 5,000 ppm of $F_2$ was treated. The flow rate of the exhaust gas was 50 liters/min. The exhaust gas 1 was countercurrent contacted with a washing liquid 4 in a gas-liquid contact area 2 packed with Raschig rings, thereby rid of components to be treated, and discharged as a treated gas 3. The dimensions of a packed column were 250 mm in diameter, and 400 mm in height. The washing liquid 4 was circulated at a rate of 10 liters/min in the apparatus by a circulating pump 5. To the washing liquid, 0.5 liter/min of feed water 7 was supplied via the dissolving tank 17 charged with 15 kg of EDTA (ethylenediaminetetraacetic acid) 16 and via a flow meter 8. To obtain constant performance for treating the gas, the pH of the washing liquid was monitored with the pH electrode 19 so that when the pH became less than 8, a 25% sodium hydroxide solution 11 would be supplied by a pump 12. Waste water 10 in the same amount as the amount of feed water supplied was discharged by a drainage pipe 9.

One hour after initiation of gas treatment, feed water at an inlet and an outlet of the dissolving tank 17 and waste water 10 were sampled and measured for the calcium ion concentration, the iron ion concentration, the fluorine ion concentration, and the EDTA concentration.

Incidentally, these concentrations in the washing liquid are assumed to be equal to those in the waste water.

The results are shown in Table 1.

TABLE 1

| Component | Inlet of dissolving tank | Outlet of dissolving tank | Waste water |
|---|---|---|---|
| Ca | 0.25 | 0.24 | 0.24 |
| Fe | 0.10 | 0.10 | 0.10 |
| F | <0.01 | <0.0 | 141 |
| EDTA | <0.1 | 0.8 | 0.76 |
| pH | 6.5 | 5.0 | 8.0 |

(Unit except pH: mmols/liter)

Table 1 shows that the feed water at the inlet of the dissolving tank contained 0.25 mmol/liter of calcium and 0.10 mmol/liter of iron. These concentrations were nearly the same as those at the outlet of the dissolving tank. The feed water at the inlet of the dissolving tank contained no EDTA, but 0.80 mmol/liter of EDTA was detected at the outlet of the dissolving tank. This may be ascribed to the dissolution of EDTA that has been accommodated in the dissolving tank. Since the solubility of EDTA is about 7 mmols, about 10% of the solubility is judged to have been dissolved. The concentrations of calcium and iron in the waste water were nearly equal to those at the outlet of the dissolving tank. It is speculated that since calcium and iron formed soluble chelate compounds with EDTA, calcium and iron did not precipitate or deposit as calcium fluoride and iron hydroxide in the exhaust gas treating apparatus, but were discharged in their unchanged concentrations.

For comparison, feed water 7 was supplied not via the dissolving tank 14, but via the bypass pipe 15. The results are shown in Table 2.

TABLE 2

| Component | Feed water | Waste water |
|---|---|---|
| Ca | 0.24 | 0.01 |
| Fe | 0.10 | 0.02 |
| F | <0.01 | 40 |
| EDTA | <0.1 | <0.1 |
| pH | 6.5 | 8.2 |

(Unit except pH: mmols/liter)

Table 2 shows that the feed water contained 0.24 mmol/liter of calcium and 0.10 mmol/liter of iron. Whereas the concentrations of calcium and iron in the waste water were 0.01 mmol/liter and 0.02 mmol/liter, respectively, both very lower than in the feed water. Most of calcium and iron may have precipitated and deposited as calcium fluoride and iron hydroxide in the exhaust gas treating apparatus.

EXAMPLE 2

With the use of the apparatus of FIG. 2, an exhaust gas 1 containing 5,000 ppm of $F_2$ was treated. The flow rate of the exhaust gas was 50 liters/min. The exhaust gas 1 was countercurrent contacted with a washing liquid 4 in a gas-liquid contact area 2 packed with Raschig rings, thereby rid of components to be treated, and discharged as a treated gas 3. The dimensions of a packed column were 250 mm in diameter, and 400 mm in height. The washing liquid 4 was circulated at a rate of 10 liters/min in the apparatus by a circulating pump 5. To obtain constant performance for treating the gas, the pH of the washing liquid was monitored with a pH electrode 16 so that when the pH became less than 8, a 25% sodium hydroxide solution 11 would be supplied by a pump 12. This sodium hydroxide solution had 1.0 mmol/g of EDTA dissolved therein beforehand. Waste water 10 in the same amount as the amount of feed water supplied (1 liter/min) was discharged by a drainage pipe 9.

Ten hours after initiation of gas treatment, feed water 7 and waste water 10 were sampled and measured for the calcium ion concentration, the iron ion concentration, the fluorine ion concentration, and the EDTA concentration.

Incidentally, these concentrations in the washing liquid are assumed to be equal to those in the waste water.

The results are shown in Table 3.

TABLE 3

| Component | Feed water | Waste water |
|---|---|---|
| Ca | 0.25 | 0.25 |
| Fe | 0.10 | 0.10 |
| F | <0.01 | 21 |
| EDTA | <0.1 | 3.5 |
| pH | 5.0 | 8.0 |

(Unit except pH: mmols/liter)

Table 3 shows that the feed water contained 0.25 mmol/liter of calcium and 0.10 mmol/liter of iron. The concentrations of calcium and iron in the waste water were nearly equal to those at the outlet of the dissolving tank. It is speculated that since calcium and iron formed soluble chelate compounds with EDTA, calcium and iron did not precipitate or deposit as calcium fluoride and iron hydroxide in the exhaust gas treating apparatus, but were discharged in their unchanged concentrations.

For comparison, the same investigation as above was conducted using a 25% NaOH solution containing no EDTA. The results are shown in Table 4.

TABLE 4

| Component | Feed water | Waste water |
|-----------|------------|-------------|
| Ca | 0.24 | 0.01 |
| Fe | 0.10 | 0.02 |
| F | <0.01 | 20 |
| pH | 6.5 | 8.2 |

(Unit except pH: mmols/liter)

Table 4 shows that the feed water contained 0.24 mmol/liter of calcium and 0.10 mmol/liter of iron. Whereas the concentrations of calcium and iron in the waste water were 0.01 mmol/liter and 0.02 mmol/liter, respectively, both very lower than in the feed water. Most of calcium and iron may have precipitated and deposited as calcium fluoride and iron hydroxide in the exhaust gas treating apparatus.

According to the present invention, the chelating agent in the washing liquid is coordinated with ions to form a water-soluble chelate compound, thus making it possible to prevent the occurrence of an insoluble product. Furthermore, the burden of periodical washing for the exhaust gas treating apparatus, as well as the frequency of parts replacement could be decreased without increases in the amount of drainage.

What is claimed is:

1. A method for purifying an exhaust gas in a wet mode, comprising the steps of:
   contacting the exhaust gas with a washing liquid containing water; circulating the washing liquid to reuse it; supplying a constant amount of a feed liquid per unit time to the washing liquid; and
   discharging the constant amount of the washing liquid per the unit time from the washing liquid,
   the washing liquid containing at least one chelating agent which reacts with ions becoming a cause of scale formation to form a water-soluble chelate compound; and
   the exhaust gas having been generated from an apparatus for producing a semiconductor device.

2. The method of claim 1, further including the step of adding an aqueous solution containing the chelating agent to the washing liquid or the feed liquid.

3. The method of claim 1, further including the step of adding a chemical solution containing water and the chelating agent to the washing liquid or the feed liquid.

4. The method of claim 1, wherein the feed liquid is obtained by the step of passing water through a column packed with a solid chelating agent having suitable solubility.

5. The method of claim 1, wherein the exhaust gas contains an acidic gas, and the step of adding a basic chemical solution to the washing liquid or the feed liquid is further included.

6. The method of claim 1, wherein the exhaust gas contains a basic gas, and the step of adding an acidic chemical solution to the washing liquid or the feed liquid is further included.

7. The method of claim 1, wherein a packed column, a spray tower, a gas passage tank, or an agitating gas passage tank is used in the contacting step.

8. The method of claim 1, wherein the ions are metal ions.

9. The method of claim 1, wherein the ions are iron ions, calcium ions, borate ions, or silicate ions.

10. The method of claim 1, wherein the chelating agent is an aminocarboxylic acid or its salt, an oxycarboxylic acid or its salt, a silicate, or a polyphosphate.

11. The method of claim 1, comprising the step of adding a chemical solution containing a pH adjustor to the washing liquid or the feed liquid.

12. The method of claim 11, comprising the steps of:
    measuring the pH of the washing liquid; and
    controlling the amount of the chemical solution containing the pH adjustor based on the measured value of pH.

13. A method for producing a semiconductor device, comprising the steps of:
    etching a precursor of the semiconductor device with an etching gas or its plasma in a chamber;
    discharging the etching gas or its plasma from the chamber;
    contacting an exhaust gas discharged from the chamber with a washing liquid containing water;
    circulating the washing liquid to reuse it;
    supplying a constant amount of a feed liquid per unit time to the washing liquid; and
    discharging the constant amount of the washing liquid per the unit time from the washing liquid,
    the washing liquid containing at least one chelating agent which reacts with ions becoming a cause of scale formation to form a water-soluble chelate compound.

14. A method for producing a semiconductor device, comprising the steps of:
    chemical vapor depositing a thin film-forming gas on a precursor of the semiconductor device in a chamber of a chemical vapor deposition apparatus to form a thin film;
    withdrawing the resulting semiconductor device from the chamber;
    cleaning the chamber of the chemical vapor deposition apparatus with a cleaning gas;
    contacting an exhaust gas in the cleaning step, which has been discharged from the chamber of the chemical vapor deposition apparatus, with a washing liquid containing water;
    circulating the washing liquid to reuse it;
    supplying a constant amount of a feed liquid per unit time to the washing liquid; and
    discharging the constant amount of the washing liquid per the unit time from the washing liquid,
    the washing liquid containing at least one chelating agent which reacts with ions becoming a cause of scale formation to form a water-soluble chelate compound.

15. The method of claim 13, further including the step of adding an aqueous solution containing the chelating agent to the washing liquid or the feed liquid.

16. The method of claim 13, further including the step of adding a chemical solution containing water and the chelating agent to the washing liquid or the feed liquid.

17. The method of claim 13, wherein the feed liquid is obtained by the step of passing water through a column packed with a solid chelating agent having suitable solubility.

18. The method of claim 13, wherein the exhaust gas contains an acidic gas, and the step of adding a basic chemical solution to the washing liquid or the feed liquid is further included.

19. The method of claim 13, wherein the exhaust gas contains a basic gas, and the step of adding an acidic chemical solution to the washing liquid or the feed liquid is further included.

20. The method of claim 13, wherein a packed column, a spray tower, a gas passage tank, or an agitating gas passage tank is used in the contacting step.

21. The method of claim 13, wherein the ions are metal ions.

22. The method of claim 13, wherein the ions are iron ions, calcium ions, borate ions, or silicate ions.

23. The method of claim 13, wherein the chelating agent is an aminocarboxylic acid or its salt, an oxycarboxylic acid or its salt, a silicate, or a polyphosphate.

24. The method of claim 13, comprising the step of adding a chemical solution containing a pH adjustor to the washing liquid or the feed liquid.

25. The method of claim 24, comprising the steps of:
measuring the pH of the washing liquid; and
controlling the amount of the chemical solution containing the pH adjustor based on the measured value of pH.

26. A method for preventing scale formation in a wet type exhaust gas treating apparatus which treats an exhaust gas containing a fluorine gas and carbon dioxide by contacting the exhaust gas with a washing liquid, characterized in that
at least one chelating agent which reacts with ions becoming a cause of scale formation to form a water-soluble chelate compound is added to the washing liquid.

27. A method for purifying an exhaust gas in a wet mode, comprising the steps of:
contacting the exhaust gas with a washing liquid containing water;
circulating the washing liquid to reuse it;
supplying a constant amount of a feed liquid per unit time to the washing liquid; and
discharging the constant amount of the washing liquid per the unit time from the washing liquid,
the washing liquid containing at least one chelating agent which reacts with ions becoming a cause of scale formation to form a water-soluble chelate compound, and
the feed liquid being obtained by a step of passing water through a column packed with a solid chelating agent having suitable solubility.

28. The method of claim 14, further including the step of adding an aqueous solution containing the chelating agent to the washing liquid or the feed liquid.

29. The method of claim 14, further including the step of adding an aqueous solution containing the chelating agent to the washing liquid or the feed liquid.

30. The method of claim 14, wherein the feed liquid is obtained by the step of passing water through a column packed with a solid chelating agent having suitable solubility.

31. The method of claim 14, wherein the exhaust gas contains an acidic gas, and the step of adding a basic chemical solution to the washing liquid or the feed liquid is further included.

32. The method of claim 14, wherein the exhaust gas contains a basic gas, and the step of adding an acidic chemical solution to the washing liquid or the feed liquid is further included.

33. The method of claim 14, wherein a packed column, a spray tower, a gas passage tank, or an agitating gas passage tank is used in the contacting step.

34. The method of claim 14, wherein the ions are metal ions.

35. The method of claim 14, wherein the ions are iron ions, calcium ions, borate ions, or silicate ions.

36. The method of claim 14, wherein the chelating agent is an aminocarboxylic acid or its salt, an oxycarboxylic acid or its salt, a silicate, or a polyphosphate.

37. The method of claim 14, comprising the step of adding a chemical solution containing a pH adjustor to the washing liquid or the feed liquid.

38. The method of claim 37, comprising the steps of:
measuring the pH of the washing liquid; and
controlling the amount of the chemical solution containing the pH adjustor based on the measured value of pH.

* * * * *

UNITED STATES PATENT AND TRADEMARK OFFICE
CERTIFICATE OF CORRECTION

PATENT NO. : 6,409,802 B1
DATED : June 25, 2002
INVENTOR(S) : Kyotani et al.

It is certified that error appears in the above-identified patent and that said Letters Patent is hereby corrected as shown below:

<u>Title page,</u>
Item [86], should read:

-- [86]   PCT No.:     PCT/JP98/04997

§371 (c)(1),
       (2), (4) Date:   Mar. 1, 2000 --

Signed and Sealed this

Twenty-fourth Day of December, 2002

JAMES E. ROGAN
*Director of the United States Patent and Trademark Office*